United States Patent [19]

Yakscoe

[11] Patent Number: 4,967,497
[45] Date of Patent: Nov. 6, 1990

[54] ADJUSTABLE AND COLLAPSIBLE GUN AND RIFLE SUPPORT

[76] Inventor: Brian J. Yakscoe, 6 Lark La., Audubon, Pa. 19403

[21] Appl. No.: 407,554

[22] Filed: Sep. 15, 1989

[51] Int. Cl.⁵ .............................................. F41A 23/14
[52] U.S. Cl. ....................................................... 42/94
[58] Field of Search ................ 42/94; 89/37.03, 37.04, 89/40.06

[56] References Cited

U.S. PATENT DOCUMENTS

| 691,912 | 1/1902 | McClean | 89/40.06 |
|---|---|---|---|
| 4,010,688 | 3/1977 | Smith et al. | 102/483 |
| 4,351,224 | 9/1982 | Curtis | 89/37.04 |
| 4,450,989 | 5/1984 | Bogar, Jr. | 224/42.45 R |
| 4,506,466 | 3/1985 | Hall | 42/94 |
| 4,548,392 | 10/1985 | Rickling | 89/37.04 |
| 4,562,945 | 1/1986 | Erlandson | 224/150 |
| 4,824,086 | 4/1989 | Rickling et al. | 269/156 |

FOREIGN PATENT DOCUMENTS 566594  1/1933  Fed. Rep. of Germany ..... 89/40.06

OTHER PUBLICATIONS

Page 188 from the Cebela's Fall Catalog 1989, Photograph-Prairie Dog Rifle Support.

*Primary Examiner*—Stephen C. Bentley
*Attorney, Agent, or Firm*—Ferrill and Logan

[57] ABSTRACT

A collapsible and adjustable firearm support, the present invention comprises a vertical support member with means for supporting a gun cradle and a horizontal support member, said vertical and horizontal support members pivotally connected to a hub; connecting arm means joining said vertical and horizontal members, said connecting arm being pivotally connected to said vertical member and slidably connected to said horizontal member such that the height and position of said vertical member is adjusted; leg means for pivotally connected to said hub for supporting said firearms support; said leg means being pivotable with respect to said vertical member whereby said leg means can support said prior arm support on an inclined surface; and gun cradle means for supporting a firearm.

12 Claims, 3 Drawing Sheets

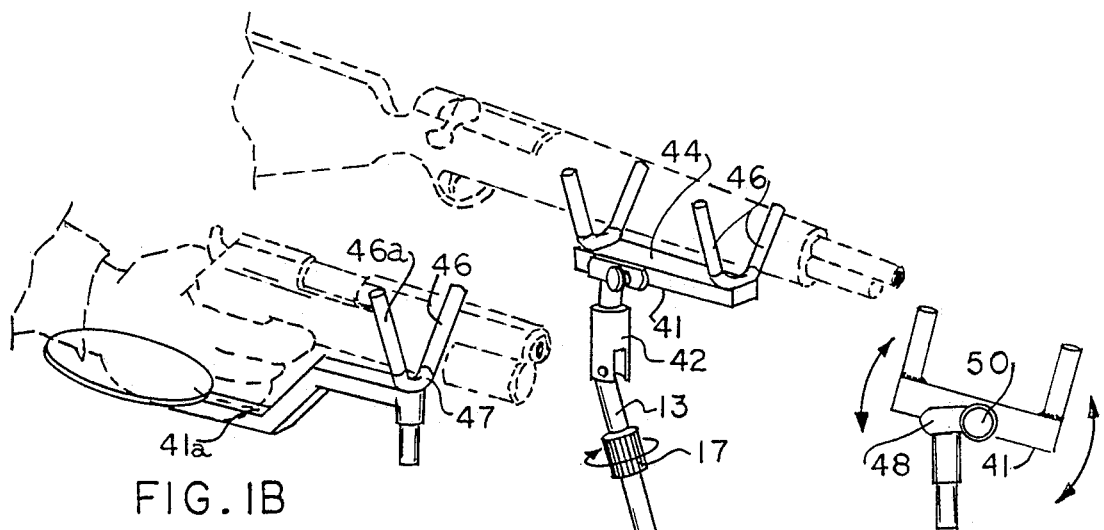
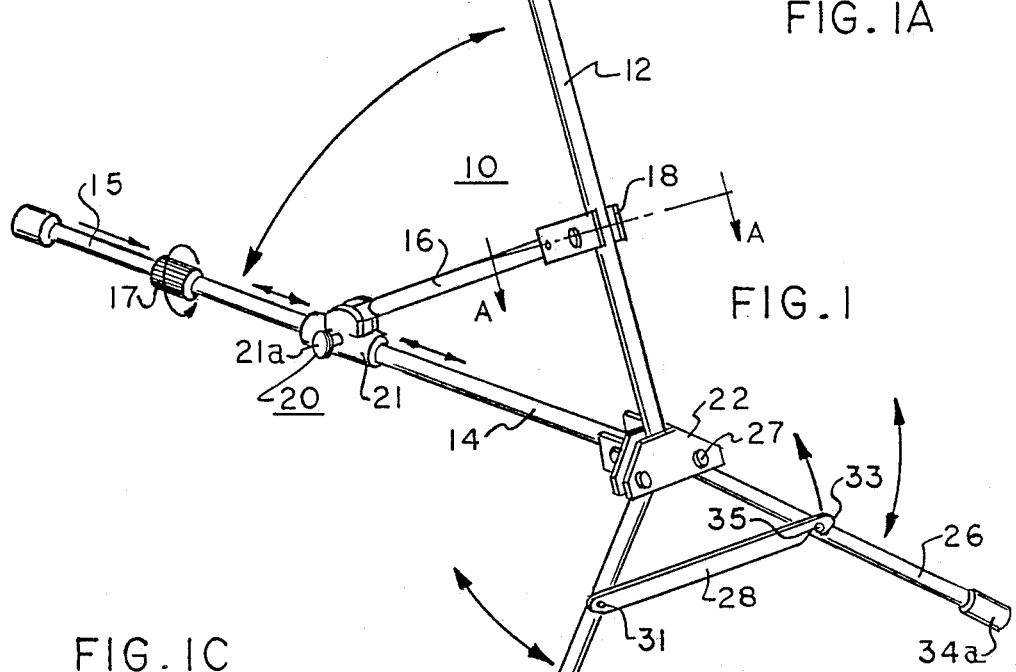
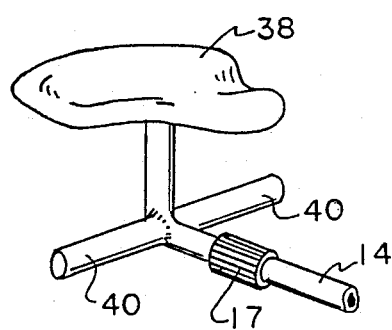

ADJUSTABLE AND COLLAPSIBLE GUN AND RIFLE SUPPORT

FIELD OF THE INVENTION

The present invention is directed to an improved gun support to be utilized by sportsmen and hunters. Specifically, the present invention is directed to a pivotable gun support which can be collapsed and folded into a carrying case.

BACKGROUND OF THE INVENTION

The present invention is directed to an improved gun support. In particular, the present invention is directed to a gun support which is adjustable, which can be utilized on inclined surfaces, and which is collapsible for easy carrying and storage.

Gun supports date from the 16th Century. The earliest gun supports consisted of a single long pole with U-shaped support which held a long musket shot in the standing position. More recently, shooters have relied upon sand bags and other support mechanisms. The most recent prior art is characterized by the use of bi-pod and tri-pod mechanisms for small arms. These devices, exemplified by the support in U.S. Pat. No. 4,351,224, fit under the barrel or stock of the gun and help support the gun barrel. While bi-pods and tri-pods provide support, they are difficult to carry and maneuver, particularly on inclined surfaces. Shooters have also recently utilized shooting benches and tables. U.S. Pat. No. 4,506,466 discloses a combination shooting table and bench. These devices are cumbersome and heavy. U.S. Pat. 4,824,086 discloses a bench rest and carrying case which is similarly cumbersome to carry and set up in the field. Finally slings such as that disclosed in U.S. Pat. No. 4,562,945 have long been popular with hunters.

While the prior art is replete with devices for holding and supporting fire arms, there is a need for a device which can be easily collapsed and folded, and which can be rapidly fixed, adjusted and positioned for varying heights on both flat and inclined surfaces.

It is an object of the present invention to provide a portable shooting device which can be utilized for either hand guns or rifles/shotguns, and which can be easily raised and lowered.

It is a further object of the present invention to provide a collapsible gun support which can be adjusted for firing on an inclined surface.

A further still object of the present invention is to provide a gun support which can be easily collapsed and folded for carrying in a carrying case.

Another object of the present invention is to provide a collapsible and foldable gun support with removable chair.

SUMMARY OF THE INVENTION

In accordance with the present invention, a collapsible firearm support comprising a vertical support member with means for supporting a gun cradle and a horizontal support member, said vertical and horizontal support members being pivotally connected to a hub; connecting arm means joining said vertical and horizontal members, a first end of said connecting arm means being pivotally connected to said vertical member and a second end of said connecting arm means being slidably connected to said horizontal member such that the height and position of said vertical member maybe adjusted and locked; leg means pivotally connected to said hub for supporting said firearm support, said leg means being pivotable with respect to said vertical member whereby said leg means can support said prior arm support on an inclined surface; and gun cradle means for supporting a firearm.

BRIEF DESCRIPTION OF THE FIGURES

The foregoing summary as well as the following Detailed Description will be better understood when read in conjunction with the drawings appended hereto. For the purpose of illustrating the invention, there is shown in the drawings an embodiment which is presently preferred, it being understood, however, that this invention is not limited to the precise arrangement and instrumentalities as shown.

FIG. 1 is a perspective view of the collapsible gun support of the present invention.

FIG. 1A is an isolated view of the pivotable rifle or shot gun cradle of the present invention.

FIG. 1B is an isolated view of the hand gun cradle of the present invention.

FIG. 1C is a perspective view of an attachable seat to be utilized with the present invention.

FIG. 1D is a plan view of the main vertical shaft and locking pin for the collapsible gun support along line A—A of FIG. 1.

DETAILED DESCRIPTION OF THE PREFERRED EMBODIMENT

Figure 2:
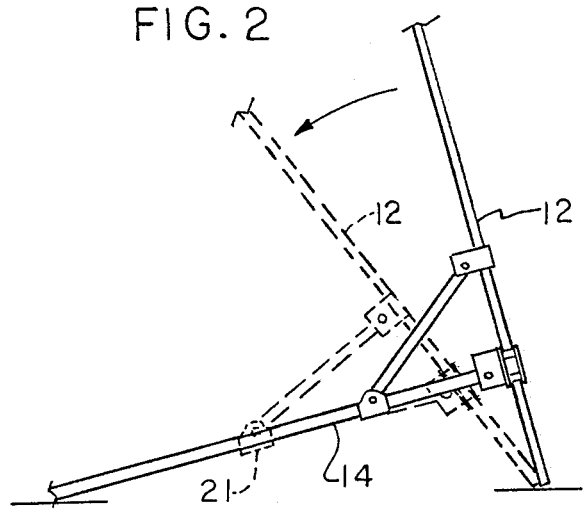
FIG. 2 is a side perspective view which illustrates the adjustability and collapsibility of the gun support of the present invention.

The present invention is described with reference to the enclosed Figures wherein the same numbers are used where applicable. Referring to FIGS. 1-1D, the collapsible gun support of the present invention is shown. The gun support comprises a main vertical shaft 12 and main horizontal shaft 14. Each shaft has a telescoping extension 13, 15 to vary the length of the shaft and which is attached and locked by a threaded collar 17. The shafts 12-15 may be constructed from steel, aluminum or any light weight material such as fiberglass or plastic.

Shafts 12, 14 are pivotably connected at a central connector or hub 22. In addition, the main vertical shaft 12 is connected at approximate its mid-point to a pivotable connecting arm or shaft 16 with connector 18 and which is connected by a sliding connector 20 to the main horizontal shaft 14.

The sliding connector 20 comprises a tube or band connector 21 with screw 21a which is used to adjust the connecting position of the connecting shaft or arm 16 along the horizontal shaft 14. While the preferred embodiment shows a sleeve connector, it will be appreciated by those skilled in the art that any connection device can be substituted therefor.

Figure 3:
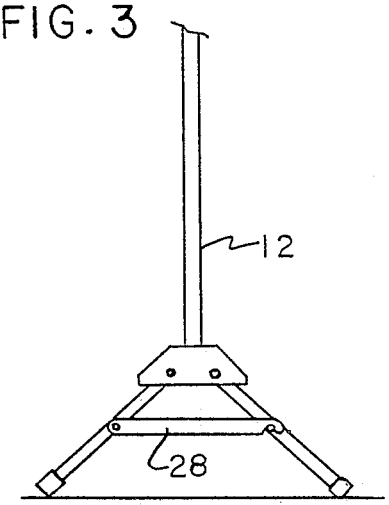
FIG. 3 is front view of the present invention illustrating the foldable legs.
Figure 4:
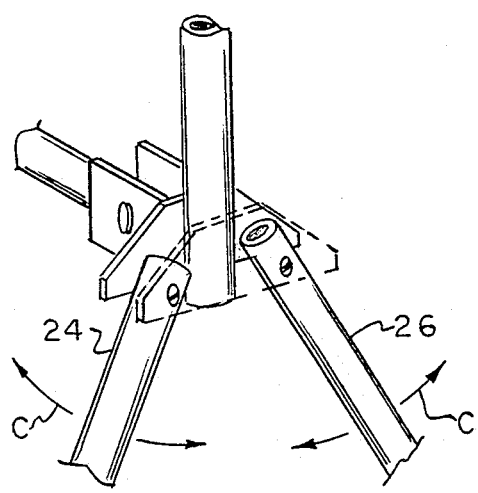
FIG. 4 is an isolated view of the central hub of the present invention which is partially broken away to illustrate the means by which the legs collapse.

As can be seen clearer in FIG. 2, the adjustment of connector 21 is used both to collapse the vertical shaft 12 into the horizontal shaft 14 as well as to adjust the height of the vertical shaft for shooting. Referring to FIG. 4, the central connector or hub 22 also has connected to it two leg members 24, 26 which are pivotally connected to the connector by screws, rivets or bolts 27. As seen in FIGS. 1, 3 and 4, the relative position of the legs 24, 26 is fixed by a crossbeam 28 which is attached by a screw 31 to leg 24 and which has a hook 33 which locks onto a screw or bolt 35 on leg 26. The legs 24, 26 have rubber or elastomeric pads 34, 34a which provide traction in use. Referring to FIG. 1C, the gun support provides an optional seat mechanism 38 which can replace telescoping member 15 and which is attached by threaded sleeve 17 to shaft 14. The seat 38 has supports 40 which provide stability and which help to maintain the seat 38 in an upright position.

Referring to FIGS. 1, 1A and 1B, the respective rifle/shotgun 41 and hand gun cradles 41a of the present invention are shown. The cradles 41, 41a are pivotally connected to a pivotable support 42 which is attached to the second telescoping member 13 on horizontal shaft 12. The rifle or shotgun cradle 41 is conventional and comprises a flat bed 44 with two up sets of upright extending supports 46. The supports 46, which may have plastic or rubber casings 47, firmly hold and cradle the stock of a rifle or shotgun 55. As shown in FIG. 1A, the rifle's cradle is vertically pivotable with respect to a central fulcrum 48 which is locked in place by an adjustable screw 50.

The hand gun support 41 is also insertable into the pivotable support 42. This device is also conventional and comprises a flat plate 54 with upstanding supports 46, 46a which support the barrel of a hand gun 57.

Figure 5:
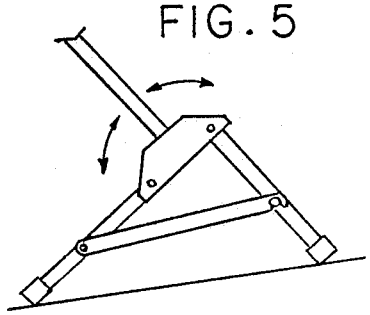
FIGS. 5 and 6 illustrate the ability of the gun support to pivot thereby facilitating its use on inclined surfaces.
Figure 6:
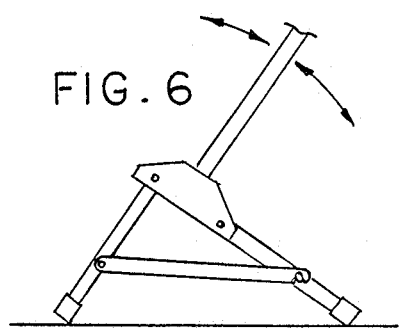

The operation of the rifle/shotgun and hand gun support of the present invention is now described with reference to all of the enclosed figures. Referring to FIGS. 1 and 2, the support is set up by adjusting the relative position of the connecting shaft along the horizontal shaft. This adjusts the height of the gun support. The legs 24, 26 are locked in place by locking crossbeam 28. Depending upon which fire arm is to be used, rifle/shotgun cradle 41 or hand gun cradle 41a is then inserted into pivotable support 42. Both the horizontal shaft 14 and vertical shaft 12 have respective telescoping members 13, 15 which can be further utilized to control the height and length of the unit. As shown in FIGS. 5 and 6, the legs are pivotable with relative to the connector or hub 22 and vertical shaft 12. This enables the gun support to be utilized in inclined surfaces. Optionally, seat 38 can be inserted into horizontal member 14.

Figure 7:
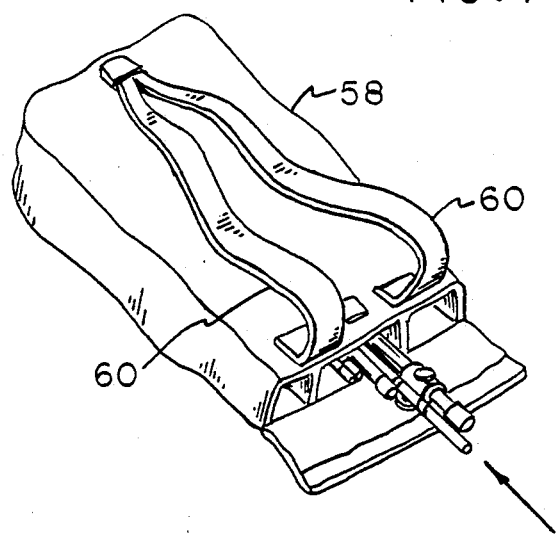

When the shooter is done firing, the connector 21 is loosened, the connecting arm 16 is slid up towards the end of horizontal shaft 14 and the vertical shaft collapses in the horizontal shaft. Connector 18 has two nubs 18a, 18b which lock the horizontal shaft 14 to the vertical shaft 12 when both members are collapsed. After the members collapse into each other the connector 21 is retightened to insure that the members do not open. Crossbeam 28 is pulled upward, and legs 24 and 26 similarly collapse up toward the vertical shaft as shown in Arrow C in FIG. 4. The unit is then placed in a convenient carrying case 58 which may be carried on the shooters back as shown in FIG. 7 with back straps 60.

While the present invention has been disclosed and described with respect to a preferred embodiment, it is to be appreciated by those skilled in the art that other embodiments fall within the spirit and scope of the present invention, and that the true nature and scope of the present invention is to be determined with respect to the claims appended hereto.

What is claimed is:

1. A collapsible firearm support comprising:
   a vertical support member including means for supporting a gun cradle;
   a horizontal support member, said vertical and horizontal support members being pivotally connected to a hub;
   connecting arm means joining said vertical and horizontal members, a first end of said connecting arm means being pivotally connected to said vertical member and a second end of said connecting arm means being slidably connected to said horizontal member such that the height and relative position of said vertical member may be adjusted, and further permitting said firearm support to be collapsed and stored;
   leg means pivotally connected to said hub for supporting said firearms support; said leg means being pivotable with respect to said vertical member whereby said leg means can support said firearm support on an inclined surface; and
   gun cradle means for supporting a firearm.

2. The collapsible firearm support of claim 1 wherein said gun cradle means is designed to support a rifle.

3. The collapsible firearm support of claim 1 wherein said gun cradle is designed to support a hand gun.

4. The collapsible firearm support of claim 1 wherein said gun cradle is designed to support a shotgun.

5. The collapsible firearm support of claim 1 wherein said gun cradle is vertically pivotable.

6. A collapsible firearm support comprising:
   a telescoping vertical support member with means for supporting a gun cradle;
   a telescoping horizontal support member, said telescoping vertical and horizontal support members being pivotally connected to a hub;
   connecting arm means joining said vertical and horizontal members, a first end of said connecting arm being pivotally connected to said vertical member and a second end of said connecting arm means being slidably connected to said horizontal member such that the height and position of said vertical member may be adjusted;
   connecting means coupled to said second end of said connecting arm means for locking the position of connecting arm on said horizontal member.
   leg means pivotally connected to said hub for supporting said firearms support; said leg means being pivotable with respect to said vertical member whereby said leg means can support said firearm support on an inclined surface; and
   gun cradle means for supporting a firearm.

7. The collapsible firearm support of claim 6 wherein said gun cradle means is designed to support a rifle.

8. The collapsible firearm support of claim 6 wherein said gun cradle is designed to support a hand gun.

9. The collapsible firearm support of claim 6 wherein said gun cradle is designed to support a shotgun.

10. The collapsible firearm support of claim 6 wherein said gun cradle is vertically pivotable.

11. A collapsible firearm support comprising:
    a telescoping vertical support member with means for supporting a gun cradle and a telescoping horizontal support member, said vertical and horizontal support members being pivotally connected to a hub;

connecting arm means joining said vertical and horizontal members, a first end of said connecting arm being pivotally connected to said vertical member and second end of said connecting arm means being slidably connected to said horizontal member such that the height and position of said vertical member may be adjusted;

connecting means coupled to said second end of said connecting arm means for locking the position of connecting arm on said horizontal member;

leg means pivotally connected to said hub for supporting said firearms support; said leg means being pivotable with respect to said vertical member whereby said leg means can support said firearm support on an inclined surface; and vertically pivotable gun cradle means for supporting a firearm.

12. A collapsible firearm support comprising:
a vertical support member with means for supporting a gun cradle and a horizontal support member, said vertical and horizontal support members being pivotally connected to a hub;

connecting arm means joining said vertical and horizontal members, a first end of said connecting arm being pivotally connected to said vertical member and a second end of said connecting arm means being slidably connected to said horizontal member such that the height and position of said vertical member may be adjusted, and further permitting said firearm support to be collapsed and stored;

connecting means coupled to said second end of said connecting arm means for locking the position of connecting arm on said horizontal member;

leg means pivotally connected to said hub for supporting said firearms support; said leg means being pivotable with respect to said vertical member whereby said leg means can support said prior arm support on an inclined surface; and pivotable gun cradle means for supporting a firearm.

* * * * *